United States Patent [19]

Shimoda et al.

[11] 4,408,790
[45] Oct. 11, 1983

[54] SHOCK-ABSORBING BUMPER FOR VEHICLES

[75] Inventors: Nobuyoshi Shimoda, Tokyo; Michiyoshi Hagino, Urawa, both of Japan

[73] Assignee: Honda Giken Kogyo Kabushiki Kaisha, Tokyo, Japan

[21] Appl. No.: 237,499

[22] Filed: Feb. 23, 1981

[30] Foreign Application Priority Data

Feb. 22, 1980 [JP] Japan ................................ 55-20488

[51] Int. Cl.³ .................................................. B60R 19/08
[52] U.S. Cl. ..................................... 293/122; 293/132
[58] Field of Search ............... 293/120, 121, 122, 126, 293/131, 132, 133

[56] References Cited

U.S. PATENT DOCUMENTS

| | | | |
|---|---|---|---|
| 4,030,735 | 6/1977 | Jacob et al. | 293/122 |
| 4,030,744 | 6/1977 | Schwuchow et al. | 293/122 |
| 4,088,357 | 5/1978 | Klei et al. | 293/122 |
| 4,090,728 | 5/1978 | Riedel | 293/122 |

*Primary Examiner*—Robert R. Song
*Attorney, Agent, or Firm*—Irving M. Weiner; Pamela S. Burt; John L. Shortley

[57] ABSTRACT

A shock absorbing bumper for vehicles, including a bumper face member formed of a synthetic resin and a metal back plate fitted in the bumper face member. The back plate includes upper and lower bent end portions provided with extensions for seizing the upper and lower edges of the bumper face member in association with the end portions of the back plate, thereby minimizing the number of parts required. The length of the back plate is substantially equal to the width of a vehicle body on which the bumper is mounted so as to effectively support the bumper face member.

7 Claims, 11 Drawing Figures (A)  (B)

SHOCK-ABSORBING BUMPER FOR VEHICLES

BACKGROUND OF THE INVENTION

1. Field of the Invention

The present invention relates generally to a bumper for vehicles, primarily for automobiles, having a face member made of a synthetic resin. More particularly, the invention relates to a shock-absorbing bumper capable of effectively absorbing the shocks resulting from a relatively light collision of a vehicle moving at a relatively low speed, such as when the vehicle is being parked or positioned in a garage.

2. Description of Relevant Art

Recently, automobiles have been provided with bumpers made of a synthetic resin to reduce the weight of the vehicle body and also to reduce the manufacturing cost. However, when a bumper is formed entirely from a synthetic resin, the material for the bumper has to be selected from a limited assortment of synthetic resins having a high hardness, and the bumper is required to be constructed with an excessive thickness. Such known synthetic resin bumper is economically disadvantageous, and at the same time the construction of same unfavorably affects the shock absorbing performance of the bumper.

In order to facilitate a thorough understanding of the advantageous functioning of the bumper according to the present invention as described in detail hereinbelow, an exemplary bumper construction is schematically illustrated in FIGS. 8(A) and 8(B) of the accompanying drawings so as to emphasize some of the disadvantages which might be encountered in a bumper which does not incorporate the features of the present invention. In such exemplary shock absorbing bumper as illustrated in FIG. 8(A), a face member a is formed in a beam-like shape having a channel-shaped cross section, with the inside thereof being lined with a steel back plate b. Another exemplary shock absorbing bumper as illustrated in FIG. 8(B) includes a filler member c formed of a polyurethane resin or a honeycomb core installed within a space defined between the face member a and a back plate b.

In the case of the exemplary shock absorbing bumper shown in FIG. 8(A), the back plate b is immediately deformed at the time of collision of the bumper with a wall or the like, which is accompanied by permanent deformation of the synthetic resin face member, thereby adversely affecting the appearance of the shock absorbing bumper. Further, the face member will be greatly deformed due to inferior shock absorption, which is inherent in its construction.

In the case of the exemplary shock absorbing bumper shown in FIG. 8(B), the face member comprises merely a decorative member, and the shock of collision is received by the material forming the filler c. However, the exemplary shock absorbing bumper of this type is disadvantageous with respect to price and weight because the absorbing efficiency of the material forming filler c is inferior, i.e., the porous filler material is easily collapsed and solidified to thus render same incapable of absorbing shocks applied thereto. Thus, such shock absorbing bumper must be formed with large dimensions to provide a long shock absorbing stroke for the face member by providing a larger space for accommodating a larger amount of the filler material.

Each of the exemplary shock absorbing bumpers shown in FIGS. 8(A) and (B) is provided with ribs a' projecting inwardly from the upper and lower ends (only the upper end being shown in the drawings) of the respective face members, and the periphery of the back plate b is fastened to the ribs at several positions by means of bolts and nuts d. Accordingly, in forming the face member a, when separating the molded face member from the mold having grooves for molding the ribs, the molded ribs interfere with the mold. To facilitate the separation of the molded face member a from the mold, the ribs are required to be flexible, and accordingly are formed of a soft synthetic resin material, the rigidity of which is not satisfactory for face members. Further, such construction requires a number of bolts and nuts for assembling the shock absorbing bumpers, resulting in an increased number of parts and more complicated assembly procedures.

The present invention provides a shock absorbing bumper formed of a synthetic resin with a simplified construction employing a minimal number of parts, which is easily assembled and is provided with a sufficient rigidity and effective shock absorbing performance.

SUMMARY OF THE INVENTION

The present invention provides a shock absorbing bumper comprising a bumper face member formed of a synthetic resin in the shape of a beam with both longitudinal end portions bent in substantially the same direction, the bumper face member having a channel-shaped cross section opening sidewardly with upper and lower edges thereof directed substantially rearwardly. A back plate formed of metal and having upper and lower bent end portions is formed to closely fit in the bumper face member with the upper and lower end portions of the back plate being in surface contact with the inner surface of the upper and lower edges of the bumper face member. The upper and lower end portions of the back plate are provided with extensions for seizing the upper and lower edges of the bumper face member in operable association with the end portions of the back plate.

Preferably, the length of the back plate is substantially equal to the width of a vehicle body on which the shock absorbing bumper is mounted. Further, outwardly extending flanges are formed along the upper and lower edges of the bumper face member over the length thereof substantially corresponding to the width of the vehicle body on which the shock absorbing bumper is mounted.

The above and other details, objects and advantages of the invention will become apparent from the following detailed description, when read in conjunction with the accompanying drawings.

DETAILED DESCRIPTION OF PREFERRED EMBODIMENTS

Figure 1:
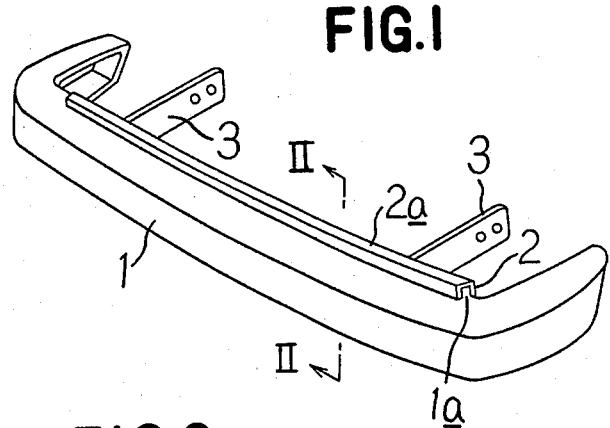
FIG. 1 depicts a perspective view of a preferred embodiment of a bumper according to the present invention.
Figure 2:
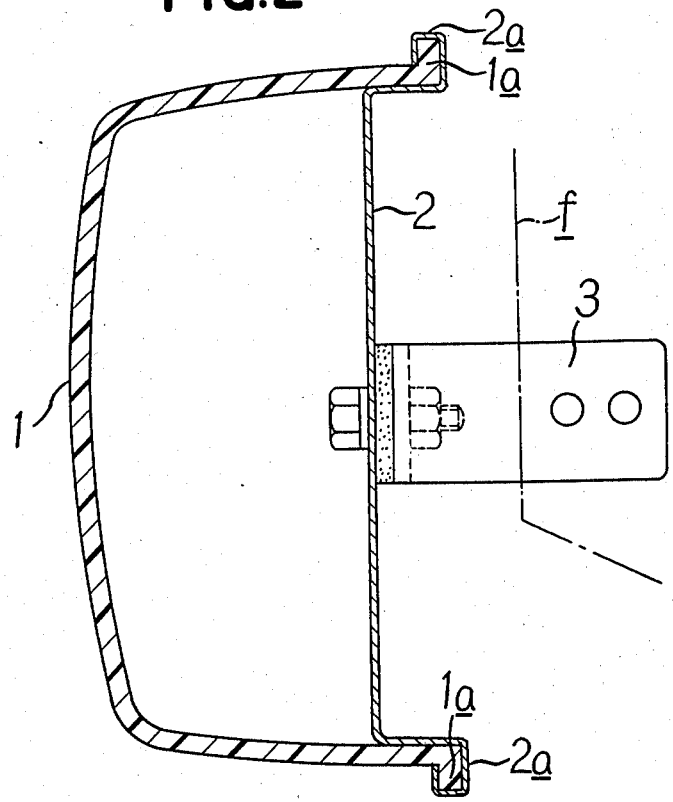
FIG. 2 is a cross sectional view taken along line II—II in FIG. 1.

With reference to FIGS. 1 and 2, there is shown a bumper face member 1 molded of a synthetic resin in the shape of a beam having a channel-shaped cross section opening sidewardly, and having a sufficient thickness (approximately 2 to 5 mm). The principal part of face member 1 extends transversely of the vehicle and both end portions thereof are bent in the same direction so as to extend over the respective sides at the front and rear end portions of the vehicle body. Outwardly-extending flanges 1a are formed along rearwardly directed upper and lower edges, respectively, of the principal part of the bumper face member 1, over a length substantially equal to the overall width of the vehicle body. A back plate 2 formed of metal, such as steel for example, has a length substantially equal to the overall width of the vehicle body and is formed with a shallow channel-shaped cross section so as to provide rigidity for the back plate and to closely fit in the bumper face member 1 with the outer surface of the upper and lower end portions of the back plate 2 in close contact with the respective inner surfaces of the upper and lower edge portions of the bumper face member 1. Thus, the width between the outer surfaces of the flanges 1a coincides with the inside width of the bumper face member 1.

Figure 3:
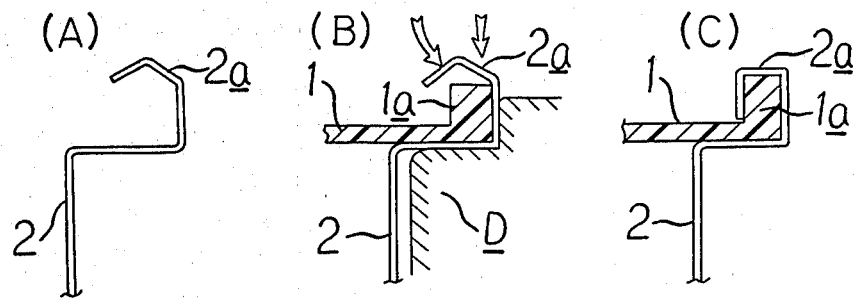
FIGS. 3(A), 3(B) and 3(C) are explanatory illustrations showing the process of incorporating a back plate to the face member of the bumper according to the invention.

Upper and lower ends of the back plate 2 are folded to form hook-shaped extensions 2a. When fitting the back plate 2 into the bumper face member 1, the back plate 2 is positioned in the opening of the principal part of the bumper face member 1 as shown in FIG. 3(B) with hook-shaped extensions 2a opened as shown in FIG. 3(A), and then the hook-shaped extensions 2a are pressed closely to the respective flanges 1a of the bumper face 1 with the front surface of the back plate 2 supported by a stepped die block D as shown in FIG. 3(B) such that the hook-shaped extensions 2a tightly overlap or seize the flanges 1a of the bumper face member 1 as illustrated in FIG. 3(C). In this manner, the back plate 2 is firmly fitted into the bumper face member 1. The bumper face member 1, constructed of a relatively thin wall of synthetic resin, is reinforced by the metal back plate 2 substantially over the entire length thereof, which is substantially equal to the width of the vehicle body. The bumper thus has a box-shaped hollow cross section as shown in FIG. 2, thereby providing a bumper assembly which is rigid as well as being lightweight. This bumper assembly is attached to the front and rear ends of the vehicle body f by means of suitable brackets 3 (FIG. 2) or dampers 4 (FIG. 5) secured to the back plate 2 at transversely spaced portions thereof.

Figure 4:
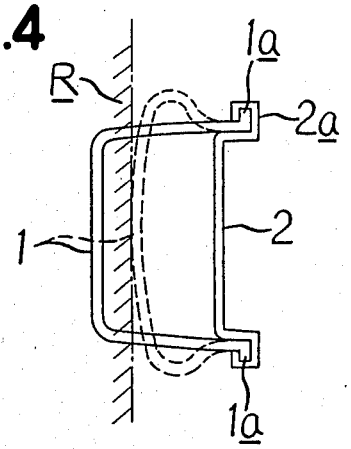
FIG. 4 illustrates the deformation of the bumper in broken lines at the time of a collision.

In the event that a vehicle provided with the bumper assembly in accordance with the present invention collides with an obstacle R (FIG. 4) such as a wall while moving at a low speed (approximately 3 to 4 km/h) and an impelling force is applied to the bumper, the bumper face member 1 is greatly deformed as shown by broken lines in FIG. 4 due to the intervening space having a sufficient volume between the members 1 and 2. Thus, the impelling force is effectively absorbed by this deformation of the bumper face member 1 before the metal back plate 2 is subjected to the impelling force. When the vehicle is moved away from the obstacle R, the bumper face member 1 is restored to its original shape by means of its own elasticity.

Figure 5:
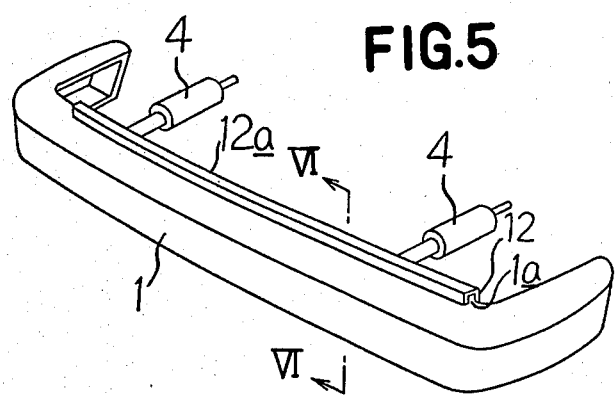
FIG. 5 depicts a perspective view of another embodiment according to the present invention.
Figure 6:
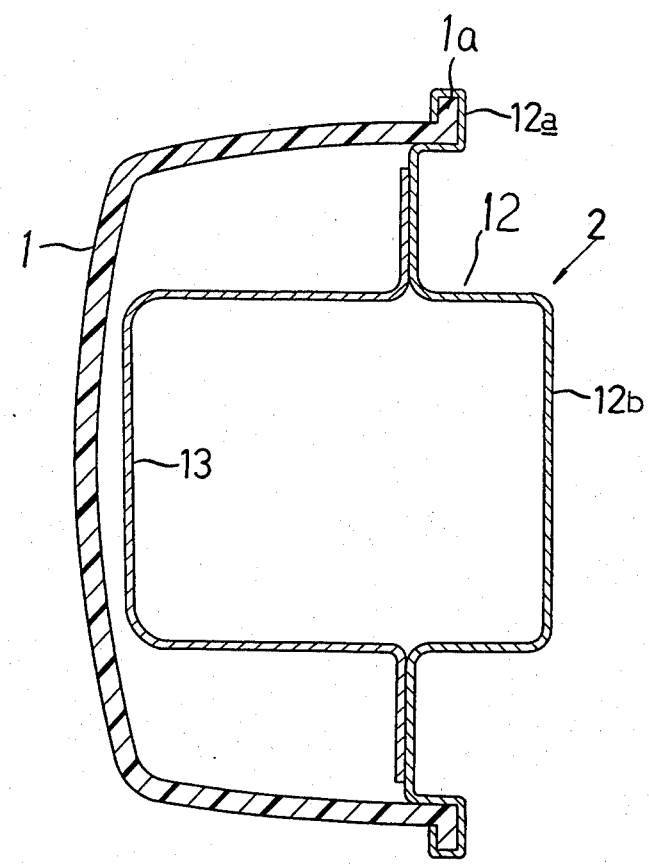
FIG. 6 is a cross sectional view taken along line VI—VI in FIG. 5.
Figure 7:
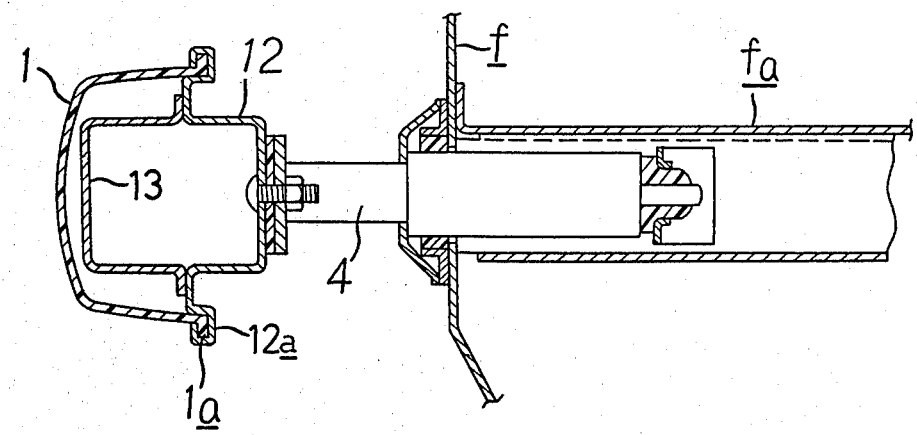
FIG. 7 illustrates the bumper of FIG. 5 as mounted on a vehicle.
Figure 8:
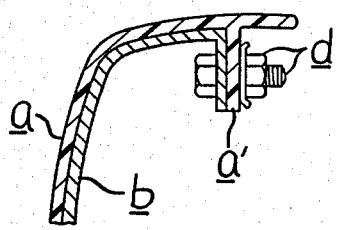
FIGS. 8(A) and 8(B) are cross sectional views of conventional bumpers.
Figure 8:
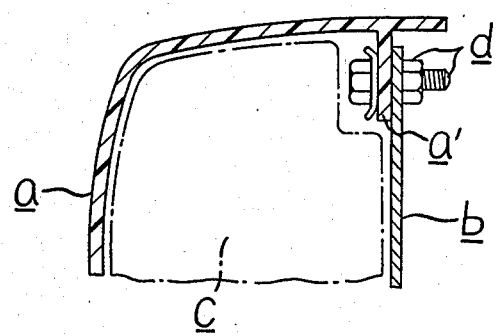

FIGS. 5 and 6 show another embodiment of the bumper assembly according to the present invention, which is capable of effectively functioning at the time of collision under a higher moving speed relative to the foregoing embodiment. The back plate 2 of the bumper assembly comprises a main back plate 12, formed at a web portion thereof with a channel 12b protruding in a direction opposite to the bumper face member 1, and provided along the upper and lower edges thereof with extensions 12a formed so as to overlap the respective flanges 1a of the bumper face member 1. An auxiliary back plate 13 is formed to have a channel shape, with the bottom wall thereof protruding toward the bumper face member 1, with a certain clearance defined therebetween, and includes flanges welded to the web portion of the main back plate 12. The main back plate 12 and the auxiliary back plate 13 are assembled so as to together define the back plate 2 in the form of a hollow beam having a box-like cross section. Hydraulic dampers 4 are attached to transversely spaced portions of the main back plate 12. As shown in FIG. 7, the bumper assembly is supported on a vehicle body f by fitting the hydraulic dampers 4 in reinforced tubular members fa respectively secured to a frame of the vehicle. This bumper assembly is provided with an increased rigidity with respect to a bending force, because the bumper face member 1 is reinforced by the hollow beam-shaped back plate 2. An impelling force applied to the bumper assembly when the vehicle is moving at a low speed is absorbed by the bending of the bumper face member 1 and auxiliary back plate 13. The impelling force applied to the bumper assembly when the vehicle is moving at a relatively higher speed is transmitted to and absorbed by the hydraulic dampers 4 without the bumper assembly being broken. Thus, the shock absorbing performance of the bumper assembly is increased relative to that of the first embodiment. Even if the magnitude of the impelling force may be so great as to cause partial permanent deformation of the auxiliary back plate 13, the bumper face member 1 is substantially unaffected by the impelling force and is restored to its original shape since the bumper face member 1 is spaced from the auxiliary back plate 13. Further, the deformation of bumper face member 1 is limited by the support of the main back plate 12.

In the preferred embodiments as described hereinabove and illustrated in the drawings, the bumper face member 1 and the back plate 2 are joined together by employing the flanges 1a of the face member 1, however, it will be understood that the bumper face member 1 and the back plate 2 may be joined together by any other suitable means.

It will be understood from the foregoing detailed description that the shock absorbing bumper in accordance with the present invention has a number of attendant advantages. The rigidity of the bumper assembly is increased and impelling forces can be effectively absorbed since the bumper face member is uniformly supported along the upper and lower edges of the principal part thereof by the back plate, with sufficient spacing being provided therebetween. Further, the back plate can be joined with the bumper face member simply by pressing the extensions of the back plate without requiring bolts and nuts, thus remarkably reducing the number of parts and facilitating assembly. The bumper face member according to the invention is easily molded since there are no inwardly projecting ribs as is necessary for the conventional bumper face member, so that the bumper face can be molded of a synthetic resin of a medium hardness as well as a soft synthetic resin in a thin wall construction, the bumper face member suffers less cracks and deformation over an extended period of service, and the construction is simplified and lightweight.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A shock absorbing bumper comprising:

a bumper face member formed of a synthetic resin in the shape of a beam with both longitudinal end portions bent in substantially the same direction, said bumper face member having a channel-shaped cross section opening sidewardly with upper and lower edges thereof directed substantially rearwardly;

outwardly extending flanges being formed along said upper and lower edges of said bumper face member over a length thereof substantially corresponding to the width of said vehicle body on which said shock absorbing bumper is mounted;

a back plate formed of metal, said back plate having upper and lower bent end portions formed to closely fit in said bumper face member with substantially the entire outer surface areas of said upper and lower bent end portions of said back plate being in surface contact with the inner surfaces of said upper and lower edges of said bumper face member; and said upper and lower end portions of said back plate being provided with extensions for continuously tightly overlapping and seizing said outwardly extending flanges formed along said upper and lower edges of said bumper face member in operable association with said end portions of said back plate.

2. A shock absorbing bumper according to claim 1, wherein:

the length of said back plate is substantially equal to the width of a vehicle body on which said shock absorbing bumper is mounted.

3. A shock absorbing bumper comprising:

a bumper face member formed of a synthetic resin in the shape of a beam with both longitudinal end portions bent in substantially the same direction, said bumper face member having a channel-shaped cross section opening sidewardly with upper and lower edges thereof directed substantially rearwardly;

outwardly extending flanges being formed along said upper and lower edges of said bumper face member over a length thereof substantially corresponding to the width of said vehicle body on which said shock absorbing bumper is mounted;

a back plate formed of metal, said back plate having upper and lower bent end portions formed to closely fit in said bumper face member with said upper and lower end portions of said back plate being in surface contact with the inner surfaces of said upper and lower edges of said bumper face member;

said upper and lower end portions of said back plate being provided with extensions for seizing said outwardly extending flanges formed along said upper and lower edges of said bumper face member in operable association with said end portions of said back plate; and said back plate comprising a main plate on the side opposite to said bumper face member and an auxiliary plate on the side facing said bumper face member, said main plate and said auxiliary plate being combined so as to form a hollow beam with a box-shaped cross section supported on a vehicle body on which said shock absorbing bumper is mounted.

4. A shock absorbing bumper according to claim 1, 2, or 3, wherein:

said back plate is formed of steel.

5. A shock absorbing bumper according to claim 1, wherein:

a space is defined between said bumper face member and said back plate at the intermediate portions thereof.

6. A shock absorbing bumper according to claim 1, wherein:

said outwardly extending flanges comprise integral outwardly bent edge portions of said bumper face member.

7. A shock absorbing bumper according to claim 6, wherein:

said upper and lower seizing extensions of said back plate are substantially hook-shaped and are respectively pressed closely around said flanges such that said flanges are tightly overlapped by said hook-shaped seizing extensions of said back plate.

* * * * *